United States Patent
Iwamura

(10) Patent No.: US 7,890,094 B2
(45) Date of Patent: Feb. 15, 2011

(54) MOBILE COMMUNICATION METHOD AND RADIO BASE STATION

(75) Inventor: Mikio Iwamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/676,676

(22) PCT Filed: Nov. 20, 2008

(86) PCT No.: PCT/JP2008/071105

§ 371 (c)(1),
(2), (4) Date: Jun. 2, 2010

(87) PCT Pub. No.: WO2009/066724

PCT Pub. Date: May 28, 2009

(65) Prior Publication Data
US 2010/0234015 A1    Sep. 16, 2010

(30) Foreign Application Priority Data
Nov. 21, 2007   (JP)   ............... 2007-302132
Nov. 12, 2008   (JP)   ............... 2008-290205

(51) Int. Cl.
*H04W 24/00* (2009.01)
(52) U.S. Cl. .............. 455/423; 455/438; 455/561; 370/332
(58) Field of Classification Search ........ 455/423, 455/436–444, 67.11–67.13, 560–561; 370/328, 370/331–333
See application file for complete search history.

(56) References Cited

U.S. PATENT DOCUMENTS

| 6,845,238 B1 * | 1/2005 | Muller ................ 455/436 |
| 2002/0052206 A1 * | 5/2002 | Longoni ............... 455/453 |
| 2006/0084390 A1 * | 4/2006 | Salonaho et al. ....... 455/67.11 |

FOREIGN PATENT DOCUMENTS

| JP | 2003-500909 A | 1/2003 |
| WO | 00/70897 A1 | 11/2000 |

OTHER PUBLICATIONS

3GPP TS 36.300 V8.2.0, Sep. 2007, "Evolved Universal Terrestrial Radio Access (E-UTRA) and Evolved Universal Terrestrial Radio Access Network (E-UTRAN)," 109 pages.
3GPP TS 25.331 V7.6.0 (Sep. 2007), "Radio Resource Control (RRC)," 1460 pages.
International Search Report issued in PCT/JP2008/071105, mailed on Jan. 27, 2009, with translation, 3 pages.
Written Opinion issued in PCT/JP2008/071105, mailed on Jan. 27, 2009, 3 pages.

* cited by examiner

*Primary Examiner*—Kamran Afshar
(74) *Attorney, Agent, or Firm*—Osha • Liang LLP

(57) ABSTRACT

A mobile communication method includes the steps of: transmitting, from a radio base station (eNB) to a mobile station (UE), a measurement rule designation command which designates addition or deletion of a measurement rule; transmitting, from the radio base station (eNB) to the mobile station (UE), a measurement object designation command, which designates addition or deletion of a measurement object, independently from the measurement rule designation command; and transmitting, from the radio base station (eNB) to the mobile station (UE), a mapping designation command which designates associating of the measurement object with the measurement rule.

9 Claims, 4 Drawing Sheets

FIG. 3

| Measurement-ID | Event-TYPE | PARAMETER |
|---|---|---|
| #1 | B1 | |
| #2 | B2 | |
| #3 | B2 | |
| #4 | B3 | |
| ⋮ | ⋮ | ⋮ |

FIG. 4

| RAT | FREQUENCY | PRIORITY LEVEL | Measurement-ID |
|---|---|---|---|
| LTE | f1 | 1 | #1 |
| LTE | f2 | 2 | #2,#3 |
| LTE | f3 | 2 | |
| UTRAN | f4 | 3 | #4 |
| UTRAN | f5 | 4 | #4 |
| GERAN | f6 | 5 | #4 |

MOBILE COMMUNICATION METHOD AND RADIO BASE STATION

TECHNICAL FIELD

The present invention relates to a mobile communication method and a radio base station.

BACKGROUND ART

Heretofore, mobile communication systems have been defined in which an inter-frequency handover can be performed for a mobile station UE in a communication environment including multiple cells (frequency cells) which uses different frequencies.

Specifically, in a mobile communication system based on the "LTE (Long Term Evolution)" defined by the 3GPP, the mobile station UE measures the communication quality in a cell (inter-frequency cell) adjacent to a frequency cell currently used for communication. Then, when determining that the measured communication quality satisfies a certain communication quality by referring to a determination condition, the mobile station UE transmits a measurement report indicating the determination, to a radio base station eNB. According to the received measurement report, the radio base station eNB determines that an inter-frequency handover from the frequency cell currently used for communication to another frequency cell having a better communication quality is to be performed for the mobile station UE.

Here, the LTE mobile communication system needs to coexist with other mobile communication systems such as a UTRAN (UMTS Terrestrial Radio Access Network) mobile communication system and a GERAN (GSM EDGE Radio Access Network) mobile communication system, which have already been introduced, and to support mobility between itself and these mobile communication systems.

Since different mobile communication systems have different services, transmission rates, radio efficiencies and the like to be provided, the optimal mobile communication system is different depending on the contract terms and the service type of a user.

Moreover, if the LTE mobile communication system includes LTE carriers (frequencies) having different bandwidths in order to support various bandwidths from 1.4 MHz to 20 MHz, the optimal frequencies are different among the services.

For example, a wide-bandwidth carrier (frequency) is preferably used for a service for downloading a large amount of data instantaneously. By contrast, such a wide-bandwidth carrier (frequency) is not necessarily used for a service such as a voice service, or a service for communication between machines.

Furthermore, flexible switching of mobile communication systems (RATs) and flexible switching of carriers (frequencies) are desired to be performed according to congestion degrees of the RATs and the frequencies.

This requires a method capable of flexibly switching between RATs and between frequencies, and particularly a control method capable of designating priorities for RATs and for frequencies, according to the contract terms and the service type of a user, and congestion degrees.

However, the conventional mobile communication systems have had a problem of being unable to flexibly change the above-described determination condition between multiple communication systems (RAT) or between carriers (frequencies) according to the priority of multiple mobile communication systems (RAT) or of carriers (frequencies).

The present invention has been made in view of the above-described problem, and has an object of providing a mobile communication method and a radio base station that are capable of flexibly changing a determination condition for determining whether or not a mobile station UE is to transmit a measurement report.

A first aspect of the present invention is summarized as a mobile communication method including the steps of: transmitting, from a radio base station to a mobile station, a measurement rule designation command which designates addition or deletion of a measurement rule; transmitting, from the radio base station to the mobile station, a measurement object designation command, which designates addition or deletion of a measurement object, independently from the measurement rule designation command; transmitting, from the radio base station to the mobile station, a mapping designation command which designates associating of the measurement object with the measurement rule; storing, at the mobile station, the measurement rule and the measurement object in association with each other, according to the mapping designation command; measuring, at the mobile station, a communication quality of an inter-frequency cell of a frequency defined by the stored measurement object; and transmitting, from the mobile station to the radio base station, a measurement report, when determining that a determination condition defined by the measurement rule associated with the measurement object is satisfied, on the basis of a measurement result of the communication quality.

In the first aspect, the radio base station can transmit the measurement rule designation command, the measurement object designation command and the mapping designation command by the same signaling.

In the first aspect, the mobile communication method can further include the step of: deleting, at the mobile station, the association between the measurement rule and the measurement object, based on the mapping designation command.

In the first aspect, the measuring of the communication quality can include: a first measurement for measuring a communication quality of an inter-frequency cell of a frequency having a higher priority than that of a cell currently used for communication; a second measurement for measuring a communication quality of an inter-frequency cell of a frequency having the same priority as that of the cell currently used for communication; and a third measurement for measuring a communication quality of an inter-frequency cell of a frequency having a lower priority than that of the cell currently used for communication.

In the first aspect, a first determination condition, a second determination condition and a third determination condition can be different; the first determination condition can be used for determining whether or not a measurement report is to be transmitted on the basis of the communication quality measured by the first measurement; the second determination condition can be used for determining whether or not a measurement report is to be transmitted on the basis of the communication quality measured by the second measurement; and the third determination condition can be used for determining whether or not a measurement report is to be transmitted on the basis of the communication quality measured by the third measurement.

A second aspect of the present invention is summarized as a radio base station including: a measurement rule designation command transmitter unit configured to transmit, to a mobile station, a measurement rule designation command which designates addition or deletion of a measurement rule; a measurement object designation command transmitter unit configured to transmit, to the mobile station, a measurement object designation command, which designates addition or deletion of a measurement object, independently from the measurement rule designation command; and a mapping designation command transmitter unit configured to transmit, to the mobile station, a mapping designation command which designates associating of the measurement object with the measurement rule, wherein the mobile station measures a communication quality of an inter-frequency cell of a frequency defined by the measurement object stored in the mobile station, and the mobile station transmits a measurement report to the radio base station, when determining that a determination condition defined by the measurement rule associated with the measurement object is satisfied, on the basis of a measurement result of the communication quality.

In the second aspect, the measurement object designation command transmitter unit and the mapping designation command transmitter unit can be configured to transmit the measurement rule designation command, the measurement object designation command and the mapping designation command by the same signaling.

In the second aspect, the measuring of the communication quality can include: a first measurement for measuring a communication quality of an inter-frequency cell of a frequency having a higher priority than that of a cell currently used for communication; a second measurement for measuring a communication quality of an inter-frequency cell of a frequency having the same priority as that of the cell currently used for communication; and a third measurement for measuring a communication quality of an inter-frequency cell of a frequency having a lower priority than that of the cell currently used for communication.

In the second aspect, a first determination condition, a second determination condition and a third determination condition can be different; the first determination condition can be used for determining whether or not a measurement report is to be transmitted on the basis of the communication quality measured by the first measurement; the second determination condition can be used for determining whether or not a measurement report is to be transmitted on the basis of the communication quality measured by the second measurement; and the third determination condition can be used for determining whether or not a measurement report is to be transmitted on the basis of the communication quality measured by the third measurement.

BRIEF DESCRIPTION OF THE DRAWINGS

FIG. 3 is a table showing an example of a measurement rule stored in the mobile station according to the first embodiment of the present invention.

FIG. 4 is a table showing an example of a measurement object stored in the mobile station according to the first embodiment of the present invention.

BEST MODE FOR CARRYING OUT THE INVENTION

Configuration of Mobile Communication System according to First Embodiment of Present Invention A configuration of a mobile communication system according to a first embodiment of the present invention will be described with reference to FIG. 1 to FIG. 5.

Figure 1:
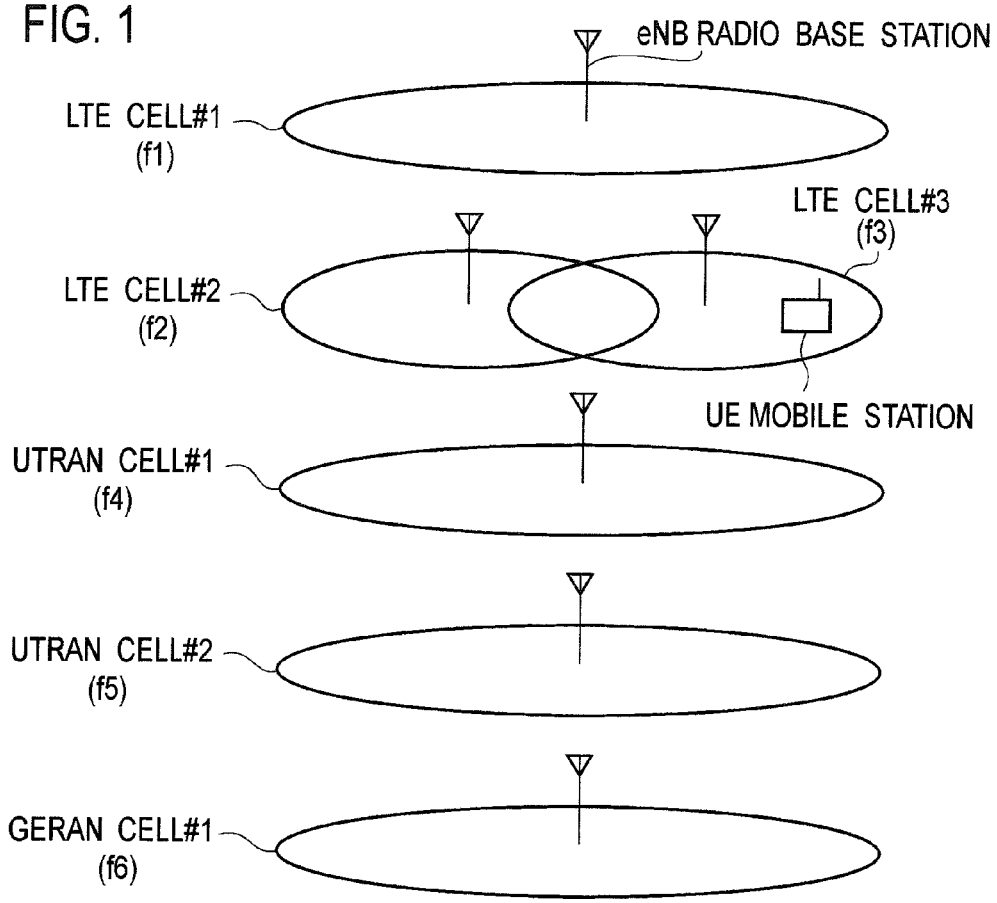
FIG. 1 is an entire configuration diagram of a mobile communication system according to a first embodiment of the present invention.

As shown in FIG. 1, the mobile communication system according to this embodiment includes: a LTE cell #1, which is a cell of a LTE mobile communication system and uses a frequency f1; a LTE cell #2, which is a cell of the LTE mobile communication system and uses a frequency f2; a LTE cell #3, which is a cell of the LTE mobile communication system and uses a frequency f3; a UTRAN cell #1, which is a cell of a UTRAN mobile communication system and uses a frequency f4; a UTRAN cell #2, which is a cell of the UTRAN mobile communication system and uses a frequency f5; and a GERAN cell #1, which is a cell of a GERAN mobile communication system and uses a frequency (band) f6.

In the example in FIG. 1, assume that a mobile station UE is currently communicating in the LTE cell #3 and is capable of measuring communication qualities in the LTE cell #1, the LTE cell #2, the UTRAN cell #1, the UTRAN cell #2 and the GERAN cell #1.

Figure 2:
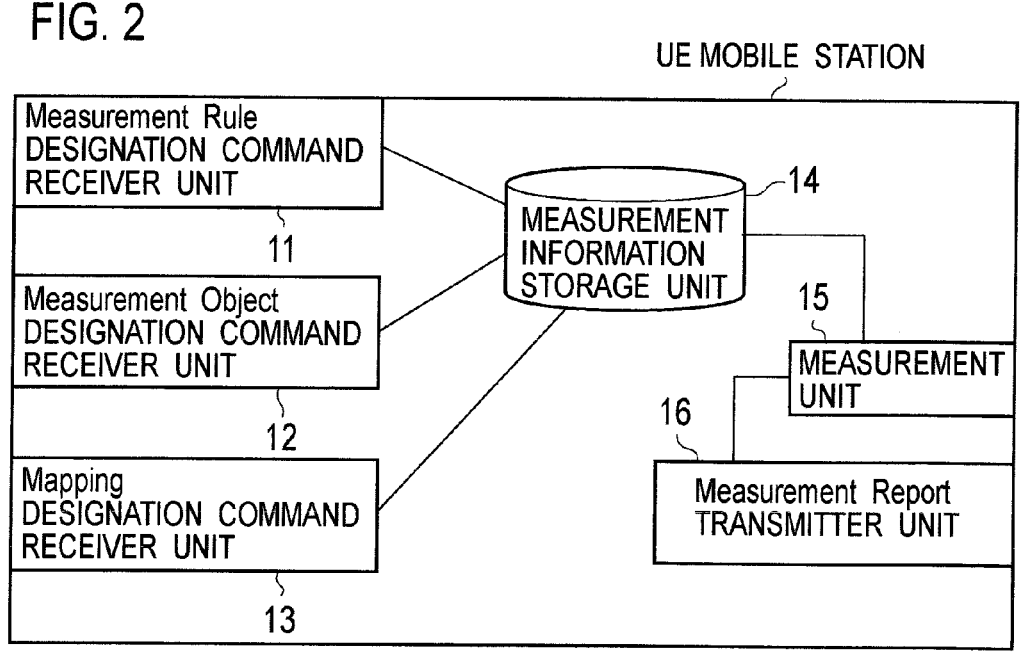
FIG. 2 is a functional block diagram of a mobile station according to the first embodiment of the present invention.

As shown in FIG. 2, the mobile station UE according to this embodiment includes a measurement rule designation command receiver unit 11, a measurement object designation command receiver unit 12, a mapping designation command receiver unit 13, a measurement information storage unit 14, a measurement unit 15 and a measurement report transmitter unit 16.

The measurement rule designation command receiver unit 11 is configured to receive a measurement rule designation command transmitted from a radio base station eNB through a broadcasting signal or a dedicated signal, and to then add or delete a "measurement rule" to or from the measurement information storage unit 14.

Here, the "measurement rule" may also be referred to as a "reporting configuration".

The measurement rule defines a determination condition for determining whether or not the mobile station UE is to transmit a measurement report based on the result of a measurement of the communication quality of an inter-frequency cell of a frequency different from that of the cell currently used for communication.

Specifically, the measurement rule is identified by a "measurement-ID", and defines a determination condition defined by an "event-type" and a "parameter" (see FIG. 3).

Here, the "measurement-ID" is information for identifying a determination condition defined by the "measurement rule".

The "event-type" is information indicating a determination condition corresponding to the determination condition defined by the "measurement rule", among a first determination condition to a third determination condition to be described below.

Here, the first determination condition is to determine whether or not a measurement report is to be transmitted on the basis of the communication quality measured in a first measurement; the second determination is to determine whether or not a measurement report is to be transmitted on the basis of the communication quality measured in a second measurement; the third determination is to determine whether or not a measurement report is to be transmitted on the basis of the communication quality measured in a third measurement.

Moreover, the first measurement mainly aims to measure the communication quality of an inter-frequency cell of a frequency that has a higher priority than that of the cell currently used for communication by the mobile station UE; the second measurement mainly aims to measure the communication quality of an inter-frequency cell of a frequency that has the same priority as that of the cell currently used for communication by the mobile station UE; the third measurement mainly aims to measure the communication quality of an inter-frequency cell of a frequency that has a lower priority than that of the cell currently used for communication by the mobile station UE.

For example, the first determination condition is defined on the basis of a condition expression shown as (Expression 1) below.

"Communication quality in the measurement object cell">"predetermined threshold Th1"  (Expression 1)

Moreover, the second determination condition is defined on the basis of a condition expression shown as (Expression 2) below.

"Communication quality in the measurement object cell"+"predetermined offset value">"communication quality in the cell currently used for communication"  (Expression 2)

Further, the third determination condition is defined on the basis of a condition expression shown as (Expression 3) below.

"Communication quality in the cell currently used for communication"<"predetermined threshold Th2", and "communication quality in the measurement object cell">"predetermined threshold Th3"  (Expression 3)

Examples of the "parameter" include the above-described predetermined thresholds Th1 to Th3, the predetermined offset value and the like.

In the above-described determination conditions, correction values that are specific respectively to the cells may also be taken into consideration in addition to measurement results of the communication qualities in the measurement object cells and the cell currently used for communication. The correction values are used to make switching to a particular cell easier, or to make switching to a particular cell more difficult, and are each specified through a broadcasting signal or dedicated signal.

Here, examples of the parameter may include a timing at which each of the above-described communication quality measurements is performed ("time to trigger"), an interval at which measurement reports are transmitted ("reporting interval"), the maximum number of transmissions of measurement reports ("maximum number of reporting times") and the like.

In addition, the measurement rule designation command receiver unit 11 may be configured to delete a particular measurement rule from the measurement information storage unit and to delete the association between the particular measurement rule and a particular measurement object, when receiving a measurement rule designation command designating deletion of the particular measurement rule.

The measurement object designation command receiver unit 12 is configured to receive a measurement object designation command transmitted from the radio base station eNB through a broadcasting signal or a dedicated signal, and to then add or delete a "measurement object" to or from the measurement information storage unit 14.

Here, the measurement object designation command receiver unit 12 may be configured to delete a particular measurement object from the measurement information storage unit 14, and to delete the association between the particular measurement object and a particular measurement rule, when receiving a measurement object designation command designating deletion of the particular measurement object.

The measurement object defines a frequency whose communication quality is to be measured, and the priority level of the frequency, in relation to each mobile station UE.

The mapping designation command receiver unit 13 is configured to receive a "mapping designation command" transmitted from the radio base station eNB through a broadcasting signal or a dedicated signal, and to associate a particular measurement rule with a particular measurement object in the measurement information storage unit 14.

Here, the "mapping designation command" may also be referred to as a "measurement identities".

The mapping designation command receiver unit 13 is configured to delete the association (mapping) between a particular measurement rule and a particular measurement object from the measurement information storage unit 14, when receiving a mapping designation command designating deletion of the association.

The measurement information storage unit 14 is configured to store measurement rules received by the measurement rule designation command receiver unit 11, as shown in FIG. 3.

The measurement information storage unit 14 is configured to store measurement objects received by the measurement object designation command receiver unit 12, as shown in FIG. 4.

The example in FIG. 4 shows that the mobile station UE is currently communicating with the LTE cell #3 using the frequency f3.

In the example in FIG. 4, defined are to: determine whether or not to transmit a measurement report based on the communication quality in the LTE cell #1 which uses the frequency f1, on the basis of the determination condition identified by "measurement-ID=#1"; determine whether or not to transmit a measurement report based on the communication quality in the LTE cell #2 which uses the frequency f2, on the basis of the determination conditions identified by the "measurement-ID=#2, #3"; determine whether or not to transmit a measurement report based on the communication quality in the UTRAN cell #1 which uses the frequency f4, on the basis of the determination condition identified by "measurement-ID=#4"; determine whether or not to transmit a measurement report based on the communication quality in the UTRAN cell #2 which uses the frequency f5, on the basis of the determination condition identified by "measurement-ID=#4"; and determine whether or not to transmit a measurement report based on the communication quality in the GERAN cell #1 which uses the frequency (band) f6, on the basis of the determination condition identified by "measurement-ID=#4".

The measurement unit 15 is configured to measure the communication quality of an inter-frequency cell of a frequency defined by a measurement object stored in the measurement information storage unit 14.

For example, the measurement unit 15 is configured to measure the communication qualities of all the inter-frequency cells each of which is associated with a measurement rule (i.e., all the inter-frequency cells for each of which a "measurement-ID" is set in the table shown in FIG. 4) among the inter-frequency cells each using a frequency defined by a measurement object stored in the measurement information storage unit 14.

The measurement report transmitter unit 16 is configured to transmit a measurement report to the radio base station eNB, when determining that the determination condition defined by the measurement rule associated with the measurement object is satisfied, on the basis of each of the communication qualities measured by the measurement unit 15.

Specifically, the measurement report transmitter unit 16 is configured to use the determination condition defined by a "measurement-ID", an "event-type" and a "parameter" included in each measurement rule stored in the measurement information storage unit 14 as shown in FIG. 3, and to thereby determine whether or not to transmit a measurement report based on the communication quality in the measurement object associated with the measurement rule.

In the example in FIG. 4, the measurement report transmitter unit 16 is configured to: determine whether or not to transmit a measurement report based on the communication quality in the LTE cell #1, on the basis of the determination condition identified by "measurement-ID=#1"; determine whether or not to transmit a measurement report based on the communication quality in the LTE cell #2, on the basis of the determination conditions identified by "measurement-ID=#2, #3"; determine whether or not to transmit a measurement report based on the communication quality in the UTRAN cell #1, on the basis of the determination condition identified by "measurement-ID=#4"; determine whether or not to transmit a measurement report based on the communication quality in the UTRAN cell #2, on the basis of the determination condition identified by "measurement-ID=#4"; and determine whether or not to transmit a measurement report based on the communication quality in the GERAN cell #1, on the basis of the determination condition identified by "measurement-ID=#4".

Here, the measurement report transmitter unit 16 may be configured to sequentially perform the above-described determination on the cells from the one using the frequency having the highest priority. The measurement report transmitter unit 16 may be configured not to perform the above-described determination after transmitting one or a predetermined number of measurement reports.

Moreover, the measurement report transmitter unit 16 is configured to store in advance templates of the first determination condition to the third determination condition shown in (Expression 1) to (Expression 3), to choose one of the templates of the first determination condition to the third determination condition specified by the above-described "event type", to substitute the parameter (the predetermined threshold or the like) included in the above-described "parameter" into the chosen template of the determination condition, and to use the resultant condition as the determination condition for the above-described determination.

For example, in the case shown in FIG. 3, the measurement report transmitter unit 16 may be configured to substitute the parameter (predetermined threshold Th1) included in the "parameter" associated with "event-type=B1", into the template of the first determination condition shown in (Expression 1) corresponding to "event-type B1", and to use the resultant condition as the determination condition for the above-described determination.

Moreover, the measurement report transmitter unit 16 may be configured to substitute the parameter (predetermined offset value) included in the "parameter" associated with "event-type=B2", into the template of the second determination condition shown in (Expression 2) corresponding to "event-type=B2", and to use the resultant condition as the determination condition for the above-described determination.

Further, the measurement report transmitter unit 16 may be configured to substitute the parameters (predetermined thresholds Th2, Th3) included in the "parameters" associated with "event-type=B3", into the template of the third determination condition shown in (Expression 3) corresponding to "event-type B3", and to use the resultant condition as the determination condition for the above-described determination.

It is to be noted that the templates of the determination conditions may be different from those shown in (Expression 1) to (Expression 3) described above.

Figure 5:
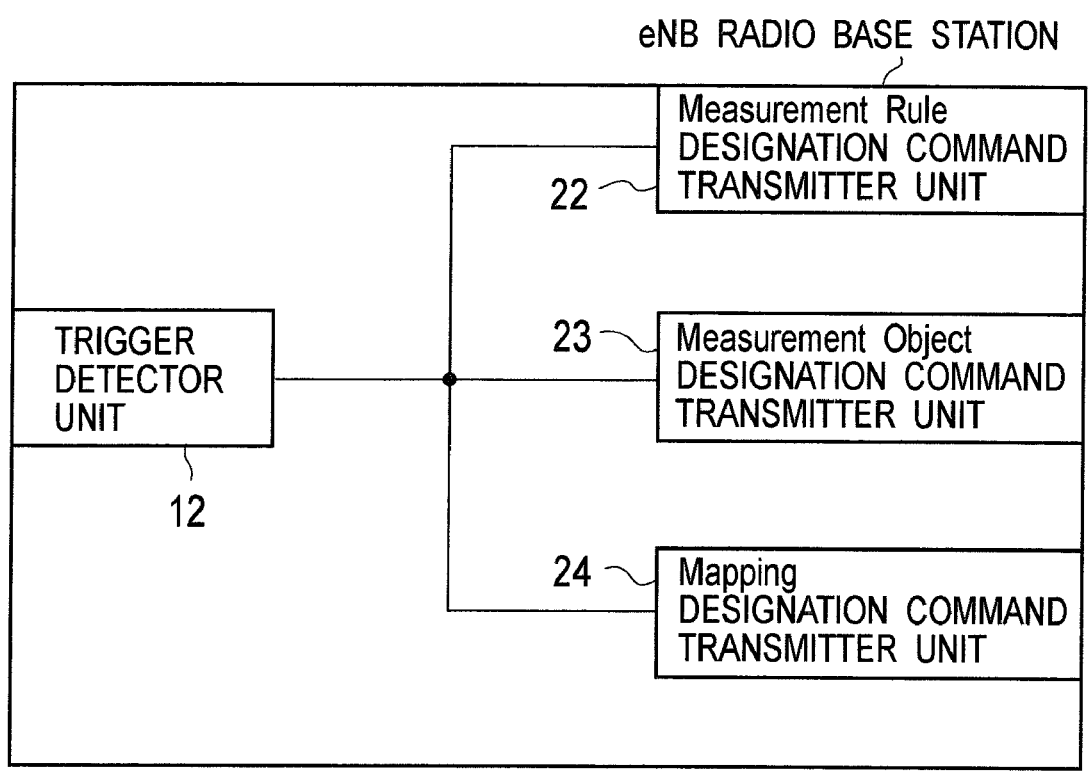
FIG. 5 is a functional block diagram of a radio base station according to the first embodiment of the present invention.

As shown in FIG. 5, the radio base station eNB according to this embodiment includes a trigger detector unit 21, a measurement rule designation command transmitter unit 22, a measurement object designation command transmitter unit 23 and a mapping designation command transmitter unit 24.

The trigger detector unit 21 is configured to detect a trigger for transmitting a measurement rule designation command, a measurement object designation command or a mapping designation command to a particular mobile station UE.

Examples of the trigger are assumed to be that the state of a particular mobile station UE is switched from an "idle state" to an "active state", that a particular mobile station UE performs an inter-frequency handover, that the communication state of a particular mobile station UE in the cell currently used for communication satisfies a predetermined condition, and the like.

The measurement rule designation command transmitter unit 22 is configured to transmit a measurement rule designation command including a "measurement-ID", an "event-type" and a "parameter", when a trigger for transmitting a measurement rule designation command to a particular mobile station UE is detected by the trigger detector unit 21.

Moreover, the measurement rule designation command transmitter unit 22 is configured to transmit a measurement rule designation command for designating addition or deletion of a measurement rule to or from the measurement information storage unit 14 of a particular mobile station UE.

The measurement object designation command transmitter unit 23 is configured to transmit a measurement object designation command including a "RAT", a "frequency" and a "priority level", independently from a measurement rule designation command, when a trigger for transmitting a measurement object designation command to a particular mobile station UE is detected by the trigger detector unit 21.

Moreover, the measurement object designation command transmitter unit 23 is configured to transmit a measurement object designation command for designating addition or deletion of a measurement object to or from the measurement information storage unit 14 of a particular mobile station UE.

The mapping designation command transmitter unit 24 is configured to transmit a mapping designation command for associating a measurement rule with a measurement object, to a particular mobile station UE.

For example, the mapping designation command transmitter unit 24 may be configured to transmit a mapping designation command including a single "frequency", a single "priority level" and a single or multiple "measurement-Ids".

Alternatively, the mapping designation command transmitter unit 24 may be configured to transmit a mapping designation command including a single "measurement-ID" and a single or multiple "frequencies".

Here, the measurement object designation command transmitter unit 23 and the mapping designation command transmitter unit 24 may be configured to transmit a measurement rule designation command, a measurement object designation command and a mapping designation command to a particular mobile station UE, by the same signaling (a broadcasting signal or a dedicated signal).

For example, as the same signaling, an "RRC connection reconfiguration message" may be used.

Alternatively, the measurement object designation command transmitter unit 23 and the mapping designation command transmitter unit 24 may be configured to respectively transmit a measurement object designation command and a mapping designation command to a particular mobile station UE, by different signaling (a broadcasting signal or a dedicated signal).

At the time of a handover of a mobile station UE, the measurement rule designation command transmitter unit 22 may transmit a measurement rule designation command for designating a measurement rule to be used by the cell that is the destination of the handover, upon receipt of a command for triggering the handover, the measurement object designation command transmitter unit 23 may transmit a measurement object designation command for designating a measurement object to be used by the cell that is the destination of the handover, upon receipt of the command for triggering the handover, and the mapping designation command transmitter unit 24 may transmit a mapping designation command for mapping the measurement rule and the measurement object, upon receipt of the command for triggering the handover.

Operation of Mobile Communication System
According to First Embodiment of Present Invention With reference to FIG. 6, operation of the mobile communication system according to the first embodiment of the present invention will be described.

Figure 6:
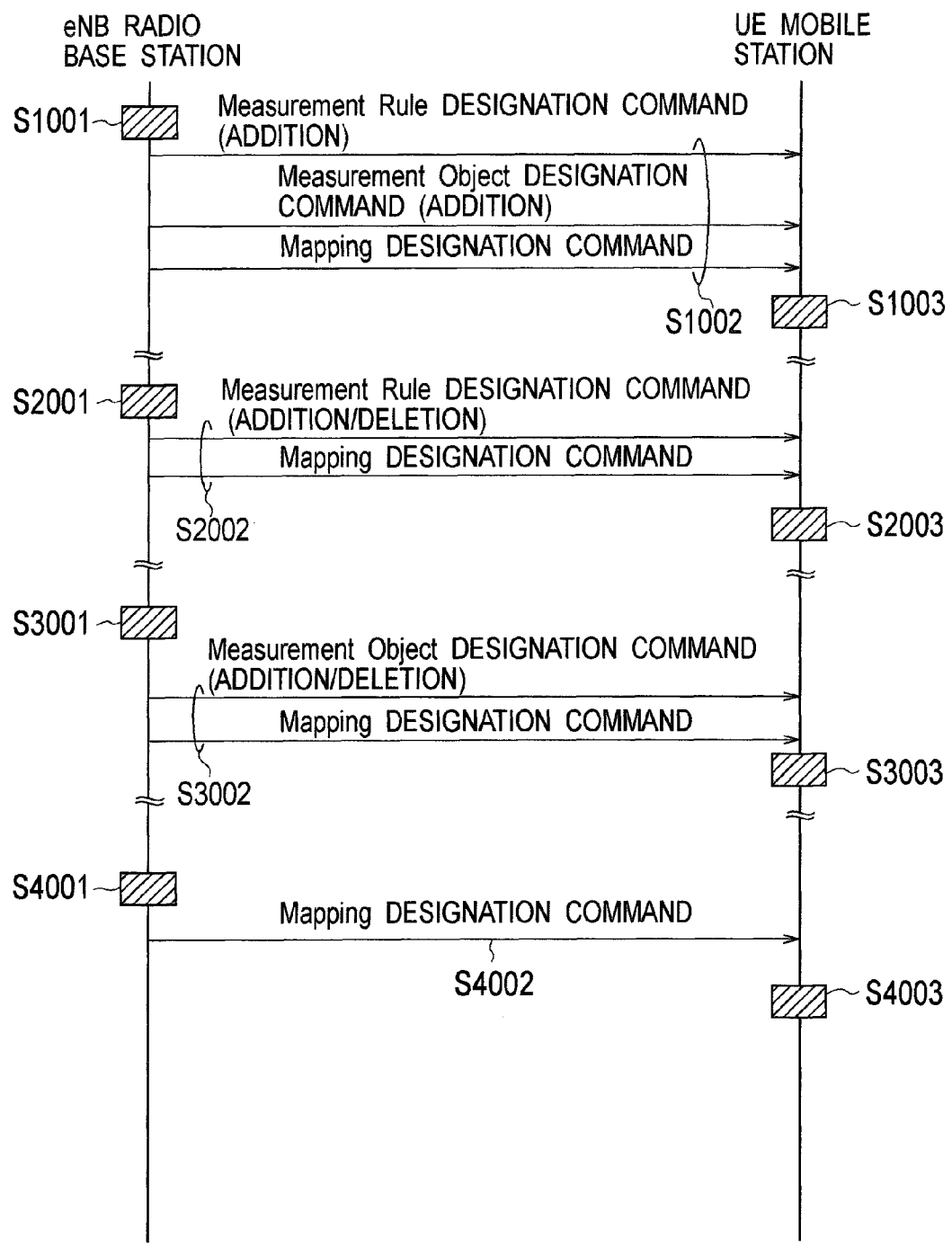
FIG. 6 is a sequence diagram showing operation of the mobile communication system according to the first embodiment of the present invention.

As shown in FIG. 6, in Step S1001, the trigger detector unit 21 of the radio base station eNB detects that the state of the mobile station UE is switched from the "idle state" to the "active state".

In Step S1002, the measurement rule designation command transmitter unit 22 of the radio base station eNB transmits a measurement rule designation command for designating addition of measurement rules to the measurement information storage unit 14 of the mobile station UE, the measurement object designation command transmitter unit 23 of the radio base station eNB transmits a measurement object designation command for designating addition of measurement objects to the measurement information storage unit 14 of the mobile station UE, and the mapping designation command transmitter unit 24 of the radio base station eNB transmits a mapping designation command for designating associating of each of the measurement rules designated to be added by the measurement rule designation command with the corresponding one of the measurement objects designated to be added by the measurement object designation command.

In Step S1003, the measurement rule designation command receiver unit 11 of the mobile station UE adds each of the measurement rules designated to be added by the received measurement rule designation command, to the measurement information storage unit 14 (see FIG. 3), the measurement object designation command receiver unit 12 of the mobile station UE adds each of the measurement objects designated to be added by the received measurement object designation command, to the measurement information storage unit 14 (see FIG. 4), and the mapping designation command receiver unit 13 of the mobile station UE associates each of the measurement rules with the corresponding one of the measurement objects in the measurement information storage unit 14.

In Step S2001, the trigger detector unit 21 of the radio base station eNB detects a change "A" of the communication state of the mobile station UE in the cell currently used for communication.

In Step S2002, the measurement rule designation command transmitter unit 22 of the radio base station eNB transmits a measurement rule designation command for designating addition or deletion of measurement rules to or from the measurement information storage unit 14 of the mobile station UE, and the mapping designation command transmitter unit 24 of the radio base station eNB transmits a mapping designation command for notifying of a change in the associations of the measurement rules with the measurement objects.

In Step 2003, the measurement rule designation command receiver unit 11 of the mobile station UE adds or deletes each of the measurement rules designated to be added or deleted by the received measurement rule designation command, to or from the measurement information storage unit 14 (see FIG. 3), and the mapping designation command receiver unit 13 of the mobile station UE changes the associations of the measurement rules with the measurement objects in the measurement information storage unit 14.

In Step S3001, the trigger detector unit 21 of the radio base station eNB detects a change "B" of the communication state of the mobile station UE in the cell currently used for communication.

In Step S3002, the measurement object designation command transmitter unit 23 of the radio base station eNB transmits a measurement object designation command for designating addition or deletion of measurement objects to or from the measurement information storage unit 14 of the mobile station UE, and the mapping designation command transmitter unit 24 of the radio base station eNB transmits a mapping designation command for notifying of a change in the associations of the measurement rules with the measurement objects.

In Step 3003, the measurement object designation command receiver unit 12 of the mobile station UE adds or deletes each of the measurement objects designated to be added or deleted by the received measurement object designation command, to or from the measurement information storage unit 14 (see FIG. 4), and the mapping designation command receiver unit 13 of the mobile station UE changes the associations of the measurement rules with the measurement objects in the measurement information storage unit 14.

In Step S4001, the trigger detector unit 21 of the radio base station eNB detects that an inter-frequency handover for the mobile station UE has been performed.

In Step S4002, the mapping designation command transmitter unit 24 of the radio base station eNB transmits a mapping designation command for notifying of a change in the associations of the measurement rules with the measurement objects.

In Step S4003, the mapping designation command receiver unit 13 of the mobile station UE changes the associations of the measurement rules with the measurement objects in the measurement information storage unit 14.

Effects and Advantages of Mobile Communication System According to First Embodiment of Present Invention By using the mobile communication system according to this embodiment, a measurement rule designation command and a measurement object designation command can be transmitted individually. Hence, a determination condition for determining whether or not the mobile station UE is to transmit a measurement report can be flexibly changed.

The operation of each of the mobile station UE and the radio base station eNB may be implemented by hardware, a software module executed by a processor, or a combination of these.

The software module may be provided in any kind of storage medium such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk or a CD-ROM.

The storage medium is connected to a processor, which allows the processor to write and read information to and from the storage medium. Alternatively, the storage medium may be integrated into the processor. The storage medium and the processor may be provided in an ASIC. The ASIC may be provided in the mobile station UE and the radio base station eNB. The storage medium and the processor may be provided as a discrete component in the mobile station UE and the radio base station eNB.

The present invention has been described in detail by using the above-described embodiment. However, it is obvious to those skilled in the art that the present invention is not limited to the embodiment described in this description. The present invention can be implemented as a modified form or a changed form without departing from the object and scope of the present invention defined by the scope of the claims. Thus, what is described in this description is intended to illustrate the present invention and not to limit the present invention.

Incidentally, the entire contents of Japanese Patent Application No. 2008-290205 (filed on Nov. 12, 2008) are incorporated in the description of this application by reference.

INDUSTRIAL APPLICABILITY

As described above, the present invention can provide a mobile communication method and a radio base station that are capable of flexibly changing a determination condition for determining whether or not a mobile station UE is to transmit a measurement report.

The invention claimed is:

1. A mobile communication method comprising the steps of:
   transmitting, from a radio base station to a mobile station, a measurement rule designation command which designates addition or deletion of a measurement rule;
   transmitting, from the radio base station to the mobile station, a measurement object designation command, which designates addition or deletion of a measurement object, independently from the measurement rule designation command;
   transmitting, from the radio base station to the mobile station, a mapping designation command which designates associating of the measurement object with the measurement rule;
   storing, at the mobile station, the measurement rule and the measurement object in association with each other, according to the mapping designation command;
   measuring, at the mobile station, a communication quality of an inter-frequency cell of a frequency defined by the stored measurement object; and
   transmitting, from the mobile station to the radio base station, a measurement report, when determining that a determination condition defined by the measurement rule associated with the measurement object is satisfied, on the basis of a measurement result of the communication quality.

2. The mobile communication method according to claim 1, wherein
   the radio base station transmits the measurement rule designation command, the measurement object designation command and the mapping designation command by the same signaling.

3. The mobile communication method according to claim 1, further comprising the step of:
   deleting, at the mobile station, the association between the measurement rule and the measurement object, based on the mapping designation command.

4. The mobile communication method according to claim 1, wherein
   the measuring of the communication quality comprises:
   a first measurement for measuring a communication quality of an inter-frequency cell of a frequency having a higher priority than that of a cell currently used for communication;
   a second measurement for measuring a communication quality of an inter-frequency cell of a frequency having the same priority as that of the cell currently used for communication; and
   a third measurement for measuring a communication quality of an inter-frequency cell of a frequency having a lower priority than that of the cell currently used for communication.

5. The mobile communication method according to claim 4, wherein
   a first determination condition, a second determination condition and a third determination condition are different;
   the first determination condition is used for determining whether or not a measurement report is to be transmitted on the basis of the communication quality measured by the first measurement;
   the second determination condition is used for determining whether or not a measurement report is to be transmitted on the basis of the communication quality measured by the second measurement; and
   the third determination condition is used for determining whether or not a measurement report is to be transmitted on the basis of the communication quality measured by the third measurement.

6. The mobile communication method according to claim 1, further comprising the steps of:
   determining, at the radio base station, whether or not the mobile station is to perform an inter-frequency handover, based on the measurement report.

7. A radio base station comprising:
   a measurement object designation command transmitter unit configured to transmit, to a mobile station, a measurement object designation command which designates addition or deletion of a measurement object defining a frequency used in a cell in which the mobile station is to measure a communication quality;

a measurement rule designation command transmitter unit configured to transmit, to the mobile station, a measurement rule designation command, which designates addition or deletion of a measurement rule defining a determination condition for determining whether or not the mobile station is to transmit a measurement report to the radio base station, independently from the measurement object designation command; and a mapping designation command transmitter unit configured to transmit, to the mobile station, a mapping designation command which designates associating of the measurement object with the measurement rule.

8. The radio base station according to claim 7, wherein
the measurement object designation command transmitter unit and the mapping designation command transmitter unit are configured to transmit the measurement rule designation command, the measurement object designation command and the mapping designation command by the same signaling.

9. The radio base station according to claim 7, wherein
the radio base station is configured to determine whether or not the mobile station is to perform an inter-frequency handover, based on the measurement report.

* * * * *